R. Pratt,

Horse Rake.

No. 1893 Reissued. Feb. 28. 1865.

Witnesses.
E. Schofer.
R. T. Dempsie

Inventor.
Rastus Pratt
by his Attys
Munn, Dennis & Thomas

UNITED STATES PATENT OFFICE.

RANDAL PRATT, OF MARPLE TOWNSHIP, DELAWARE COUNTY, PA.

IMPROVEMENT IN HORSE HAY-RAKES.

Specification forming part of Letters Patent No. 14,067, dated January 8, 1856; Reissue No. 1,893, dated February 28, 1865.

DIVISION No. 1.

*To all whom it may concern:*

Be it known that I, RANDAL PRATT, of the township of Marple, Delaware county, State of Pennsylvania, have invented a new and useful Improvement in Horse Hay-Rakes; and I do hereby declare that the following is a full, clear, and exact description of the same, as designated by Division No. 1, reference being had to the accompanying drawings, making a part of this specification, in which—

Figure 2:
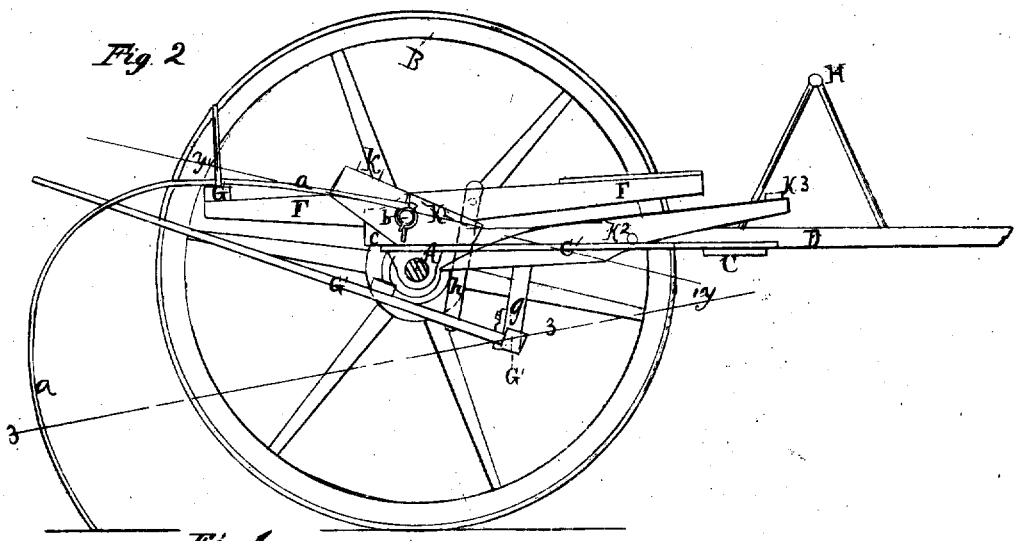
Figure 1:
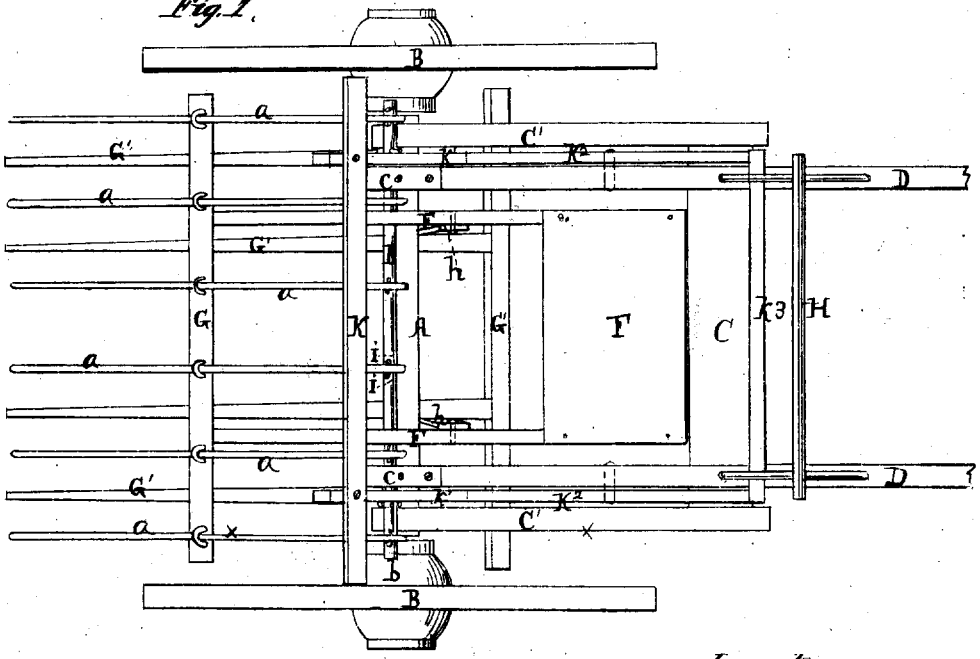

Figure 1 is a plan view of my improved rake complete. Fig. 2 is a vertical longitudinal section of the same in the line *x x* of Fig. 1.

The same letters of reference in the different figures indicate corresponding parts.

The nature of the invention covered by this patent consists, first, in the arrangement of a standard-board, two sets of treadle-levers, two foot-boards, and a lifting-bar and a pressure-bar, as will be hereinafter described; second, in the arrangement of a hand-rail, in combination with the stand-board, treadle-levers, foot-boards, and lifting and pressure bars, as will be hereinafter described; third, in the arrangement of the pressure-bar upon levers which are independent of the treadle-levers in their elevating motion, but are dependent upon said levers in their depressing motion, as will be hereinafter described; fourth, in a novel arrangement, in a wheeled rake, of articulating rake-teeth, a lifting-bar, a pressure-bar, and treadles, as will be hereinafter described; fifth, in the arrangement, with rake-teeth which terminate on their axial rod, or do not extend forward to be operated by a depressing-frame arranged forward of the carriage-axle, of a pressure-frame and a lifting-frame, said two frames having separate movements from each other, and both being located in rear of the axle-rod of the rake-teeth, as will be hereinafter described; sixth, in pivoting the levers of the lifting-bar and of the pressure-bar concentric with the axis of motion of the rake-teeth, in combination with the arrangement of the pressure and lifting bars in rear of said axis of motion, and with the extending of the frames or levers of the said bars in front of the axle, so that they may be operated by the feet of the driver, as will be hereinafter described.

To enable others skilled in the art to make and use my invention, I will proceed to describe its construction and operation.

The carriage which supports the rake and the devices for operating it consists of an axle-tree, A, mounted upon two wheels, B B, and provided with a platform or stand-board, C C′, for the driver. This platform C is some distance in advance of the axle and is sustained by means of the thills D D. In order to keep the driver steady upon this stand-board when the machine is in motion, I erect a frame or guard, H, the posts of which may be mortised into the platform or thills and suitably braced, so that the guard H will be firmly and substantially held in position. The position of this guard-rail is in advance of the axle A, or at the forward part of the platform C, and sufficiently raised above the latter to enable the driver to grasp it with his hands when standing erect. By this construction I am enabled to have the driver ride upon the machine. This being secured, it is important that the treadles for operating the elevating and depressing bars, hereinafter to be described, be so arranged as to be under the convenient control of the driver, and to do this two levers, $k^2$ $k^2$, are pivoted to the sides of the thills a short distance in rear of the platform C, and extended back from their fulcra, so as to pass under short levers $k'$ $k'$, which are pivoted concentrically with the motion of the rake-teeth upon the rake-bar *b*, and to which a horizontal transverse pressure-bar, *k*, is attached, as shown in Figs. 1 and 2. This bar is in rear of the rake-bar, and extends across all the teeth of the rake, and rests on top of the same, so that when pressure is put upon the two levers $k^2$ $k^2$ it will act uniformly upon the bar *k*, and consequently in like manner upon all the rake-teeth. This pressure is exerted by the driver with his feet while he is mounted upon the platform C, and to render it convenient for him to do this the levers $k^2$ $k^2$ are extended to the forward part of the platform and connected together by a transverse foot-board, $k^3$, as represented. If an ordinary pressure of the foot is not sufficient to keep the rake-teeth down to their raking position, the driver can bring his entire weight to bear upon the rake-teeth by standing upon the board $k^3$ and balancing himself by holding upon the guard-rail H. By stepping off of the board $k^3$ the pressure on the teeth $a$ will be instantly removed. With this arrangement the pressure upon the teeth can be regulated just in proportion as the swath increases or decreases in weight—that is, in proportion to the resistance to be overcome by the rake-teeth the driver can regulate the amount of pressure. The position of the board $k^3$ is such that the driver will be but very little inconvenienced in bringing his weight to bear upon it whenever it is necessary. In order to more effectually carry out this part of my invention, the rake-teeth are all independently pivoted to a horizontal bar, $b$, which extends across the machine, nearly over and in line with the axle-tree A, upon which this bar is supported at suitable points by means of eye-bearings or studs or posts $c$, as shown in Figs. 1 and 2 of the drawings. It will also be desirable to have the teeth made of spring steel or metal, so that they may be capable of yielding backward when they strike an obstruction in their path.

At an intermediate point between the ends of the rake-bar, and within the frame of stand-board C, another frame, F, is arranged, and so pivoted on the rake-bar that its axis of motion is concentric with the axis of motion of the rake-teeth. This frame extends out a suitable distance on each side of the rake-bar $b$, and on its forward end a foot-board is secured, upon which the driver presses his foot when he desires to elevate the teeth of the rake. On the rear end of the frame F a horizontal transverse bar, G, is secured, and over this bar all the teeth $a$ pass, as shown in Figs. 1 and 2. This bar is some distance in rear of the pressure-bar $k$, and it serves to support all the teeth at a proper distance with respect to the ground, and also as a means for lifting all the teeth. It will be seen that when the frame F is moved in the plane indicated by red line $y$ $y$ in Fig. 2 the bar G will raise all the teeth, and thereby throw them up to a discharging position, and when the pressure is withdrawn from the foot-board of this frame all the teeth will return to their former raking position, which is represented by black lines in Fig. 2. While the frame is intended as a means for elevating the teeth, it is not intended that it should interfere with the rising and falling movements of these teeth, either singly or together, which movements are necessary to allow the teeth to free themselves of obstructions in their path, as well as to discharge the gathered hay. The frame F being pivoted to the rake-bar $b$ concentric with the axis of motion of the teeth, it can be operated with greater facility than if it had an independent axis eccentric to the bar $b$, because with the concentric arrangement the teeth at once commence to rise, without sliding on the lifting-bar G, whenever the pressure is applied to the foot-board of the frame F. The connection of the frame F and of the levers $k'$ $k'$ with the bar $b$ is made by simply passing the latter through the former, and thus the eye-bearings $c$ $c$ become the support of them, as well as of the bar $b$. The pressure which is applied to the bar $k$ through its own weight and that of the levers $k'$ $k'$ will not materially interfere with the rising of the teeth, although it will be sufficient to keep the teeth down during the operation of raking light swaths, and as the levers $k'$ $k'$ are not pivoted to the levers $k^2$ $k^2$ the whole series of teeth, or any one of them, may articulate at will, unless the weight of the driver is upon the levers $k^2$ $k^2$, and in that event, if the resistance to be overcome is too great for the teeth to bear, the driver can instantly relieve the teeth by withdrawing his weight from the levers $k^2$ $k^2$, and, if thought advisable, transferring it to the lifting contrivance F G, either of which expedients will have the effect of saving the teeth from injury. Thus it will be seen that it is important to have the attendant on the machine, and the means for applying the pressure convenient for being operated from the stand-board or support, and so adapted to the machine that the attendant can have free use of his hands to manage his team. So, also, is it important, to this end, to have the lifting contrivance arranged convenient for being operated by the driver.

It will be observed that I use rake-teeth $a$, which terminate at their axial rod, and do not extend forward under a bar, as usual, in order to be depressed by such extended portions when it is desired to throw up their rear or raking ends. I am enabled to use ordinary rake-teeth, by reason of having both the pressure-bar and the lifting-bar in rear of the axial rod of the teeth, and to bear upon the teeth at points in rear of said axial rod.

What I claim as my invention, and desire to secure by Letters Patent, is—

1. A wheeled rake with a stand-board or platform, C, two sets of treadle-levers, two foot-boards, and a lifting and a pressure bar, arranged and operating substantially in the manner and for the purpose described.

2. A wheeled rake with a hand-rail, a stand-board, treadle-levers, foot-boards, and a lifting and a pressure bar, arranged and operating substantially in the manner and for the purpose described.

3. The arrangement of the pressure-bar $k$ upon levers $k'$ $k'$, which are independent, in their rising movements, of the treadle-levers $k^2$ $k^2$, but are dependent upon said levers, or their equivalent, in their depressing movement, substantially as and for the purposes herein set forth.

4. The arrangement, in a wheeled rake, of independently-articulating teeth, a lifting-bar, a pressure-bar, and treadles, substantially in the manner and for the purposes herein described.

5. The arrangement, with rake-teeth which terminate on their axial rod, as described, of a pressure-bar and a lifting-bar such bars having separate movements imparted to them, and both acting on the teeth at points in rear of the axial bar *b*, substantially as herein described.

6. The concentric arrangement of the lifting and pressure bars, or either of them, in combination with the extending of the frames or levers of said bars in front of the axial bar *b*, and with the arrangement of the bars G and *k* in rear of the axial bar *b*, substantially in the manner and for the purpose described.

7. A treadle-frame with lifting-bar G, pivoted concentric with the axis of motion of the rake-teeth, in the manner and for the purpose set forth.

RANDAL PRATT.

Witnesses:
GEO. H. RIGBY,
EZRA SMEDLEY.